UNITED STATES PATENT OFFICE.

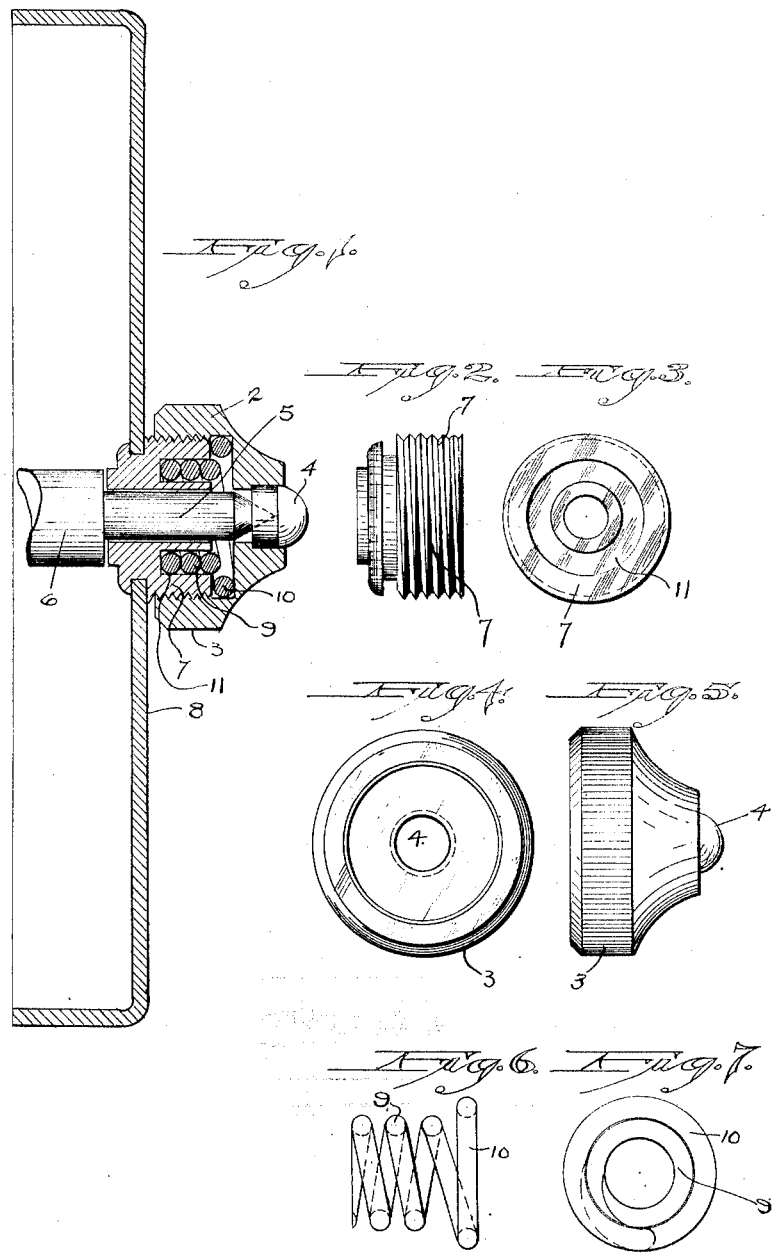

WALTER R. KOPP, OF NEW HAVEN, CONNECTICUT, ASSIGNOR TO WINCHESTER REPEATING ARMS CO., OF NEW HAVEN, CONNECTICUT, A CORPORATION.

FISHING-REEL.

1,372,301.     Specification of Letters Patent.     Patented Mar. 22, 1921.

Application filed July 26, 1920. Serial No. 398,993.

*To all whom it may concern:*

Be it known that I, WALTER R. KOPP, a citizen of the United States, residing at New Haven, in the county of New Haven and State of Connecticut, have invented a new and useful Improvement in Fishing-Reels; and I do hereby declare the following, when taken in connection with the accompanying drawings and the characters of reference marked thereon, to be a full, clear, and exact description of the same, and which said drawings constitute part of this application, and represent, in—

Figure 1. a broken view partly in elevation and partly in diametral section of a fishing-reel provided with my invention.

Fig. 2. a detached view in elevation of the bushing thereof.

Fig. 3. a view thereof of inside elevation.

Fig. 4. a detached view in inside elevation of the oil-cap.

Fig. 5. a view thereof of outside elevation.

Fig. 6. a detached view of the inside elevation of the locking-spring.

Fig. 7. a view in elevation of the outer end thereof.

My invention relates to an improvement in fishing-reels, the object being to provide a simple, adjustable, dust-proof structure designed with particular reference to the exclusion of dust from the running parts. With these ends in view my invention consists in certain details of construction and combinations of parts as will be hereinafter described and pointed out in the claims.

In carrying out my invention as herein shown, I employ an oil-cap 2 having a knurled peripheral band 3 mounting a jewel 4 receiving the pointed end of the pivot 5 of the spindle 6 of the reel. The said cap is internally threaded to adapt it to be adjustably mounted upon an externally threaded bushing 7 providing a housing for the pivot 5 and itself riveted in the reel-cap 8. For locking the oil cap 2 in any position of adjustment upon the bushing 7, I employ a helical spring 9 the outer coil 10 of which exceeds the diameter of the other coils thereof. The inner end of this spring is inserted into a concentric annular recess 11 entering the outer face of the bushing 7, while the larger outer coil 10 of the spring is located in the bottom of the bore of the cap 2 at a point within the internal threads thereof. When the cap 2 is screwed upon the bushing 7, the said spring is compressed with the production of enough friction to hold the cap in any given position thereupon, the friction developed by the spring being increased by its outer coil which exposes a larger surface to friction than its inner coil which rests upon the bottom of the recess 11.

I claim:

1. A fishing-reel having a reel-cap, an externally threaded bushing mounted therein and formed with an annular recess entering its outer face, a spindle provided with a pivot housed within the said bushing, an internally threaded oil-cap applied to the externally threaded bushing, a jewel mounted in said oil-cap and providing a bearing for said pivot, and a spring interposed between the bushing and oil-cap and located in the said annular recess for frictionally holding the said oil-cap against turning.

2. A fishing-reel having a reel-cap, an externally threaded bushing mounted therein and formed with an annular, concentric recess entering its outer face, a spindle having a pivot passing outward through the said bushing, an internally threaded oil-cap applied to the bushing, a jewel mounted in the oil-cap and providing a bearing for the pivot, and a spring located in the said recess of the bushing and having its outer coil enlarged and located within the bottom of the oil-cap, whereby the spring is compressed with the development of sufficient friction to hold the cap from turning.

In testimony whereof I have signed this specification in the presence of two subscribing witnesses.

WALTER R. KOPP.

Witnesses:
    ERIK S. PALMER,
    A. E. HODGSON.